United States Patent [19]

Clarke

[11] Patent Number: 5,754,287
[45] Date of Patent: May 19, 1998

[54] BEAM PROJECTING PLUMB APPARATUS

[76] Inventor: Douglas A. Clarke, 5929 Fordland Ave., Raleigh, N.C. 27606

[21] Appl. No.: 779,164

[22] Filed: Jan. 6, 1997

[51] Int. Cl.$^6$ ........................................... G01C 9/12
[52] U.S. Cl. ........................ 356/250; 33/227; 33/286
[58] Field of Search ........................ 356/247, 138,
356/149, 248, 250, 172, 399; 33/227, 286,
DIG. 21, 281, 282, 290, 299, 283, 285,
291, 340, 341, 370, 371, 407, 451, 375,
384, 387, 388; 211/69.6, 69.1, 69.5, 69.7,
69.8, 69.9

[56] References Cited

U.S. PATENT DOCUMENTS

| | | | |
|---|---|---|---|
| 3,505,739 | 4/1970 | Abrams | 365/250 |
| 3,768,314 | 10/1973 | Metzler et al. | 73/432 |
| 3,810,550 | 5/1974 | Longarzo | 211/69.6 |
| 3,858,984 | 1/1975 | Denton et al. | 356/250 |
| 3,911,588 | 10/1975 | Ohneda | 33/286 |
| 4,183,667 | 1/1980 | Denton | 356/250 |
| 4,448,528 | 5/1984 | McManus | 356/250 |
| 4,751,782 | 6/1988 | Ammann | 33/291 |
| 4,912,851 | 4/1990 | Rando et al. | 33/227 |
| 5,012,585 | 5/1991 | DiMaggio | 33/286 |
| 5,184,406 | 2/1993 | Swierski | 33/227 |
| 5,519,942 | 5/1996 | Webb | 33/290 |
| 5,524,352 | 6/1996 | Rando et al. | 33/291 |
| 5,537,205 | 7/1996 | Costa et al. | 356/250 |
| 5,539,990 | 7/1996 | Le | 33/283 |
| 5,541,727 | 7/1996 | Rando et al. | 356/149 |
| 5,572,797 | 11/1996 | Chase | 33/286 |

FOREIGN PATENT DOCUMENTS

679425A5  2/1992  Switzerland.

*Primary Examiner*—Frank G. Font
*Assistant Examiner*—Michael P. Stafira
*Attorney, Agent, or Firm*—Olive & Olive, P.A.

[57] ABSTRACT

A plumb apparatus is described in two embodiments having common operational and construction features. In a first embodiment, a beam projector is mounted within an upper end of an elongate pipe which is slidingly fit in an angularly pivotable mounting. The lower end of the pipe is formed with a point adapted to contact a target point on a supporting surface when a base in which the angularly pivotable mounting is held is placed on the surface. A bi-axial level is attached to the upper end of the pipe to ascertain vertical orientation of the pipe, which orientation is maintained by the weight of the base structure which is in contact with the supporting surface. The beam projector is activated to project a beam to a target point on the ceiling above. According to the second preferred embodiment, a beam projector is mounted into an upper end of a pipe, the lower end of which is mounted into a ball. The ball is placed into a cup which is engaged by a clamp cover having an opening through which the pipe extends. A bi-axial level is attached to the upper end of the pipe to ascertain vertical orientation of the pipe, which orientation is maintained by screwing the clamp cover to prevent further pivoting of the ball.

6 Claims, 5 Drawing Sheets

BEAM PROJECTING PLUMB APPARATUS

BACKGROUND OF THE INVENTION

1. Field of the Invention

This invention relates to apparatus used in the construction industry for determining the location of a target point on a remote surface relative to a guide point on an opposed surface.

2. Description of the Related Art

The present invention is directed to the common need in the construction industry for determining the location of a target point on a remote surface. This determination may be for any of a number of subsequent operations, such as positioning joists, locating a point on a wall or ceiling for making an opening, aligning a column or providing a level reference. In the embodiments disclosed below, the invention relates to the location of a target point on a ceiling with relation to a point indicated in a building plan, e.g. for the installation of an electrical fixture.

In the traditionally used building method, to locate such a target point, a worker would climb a ladder, extend a measuring device to an adjacent wall structure, mark a first point on the ceiling and repeat the process for a second adjacent wall structure to get a two dimensional location on the ceiling. It is sometimes necessary for the worker to move the ladder after measuring the distance from the first wall in order to measure the distance from the second wall structure. If either or both wall structures are too far away from the desired point for the worker to reach, it may be necessary to employ the help of a second worker to hold an end of the measuring device to be able to make the measurements. Furthermore, if the ceiling is not level, measurement of an exact point is more difficult and less accurate.

There have been numerous prior attempts to overcome the problems associated with this ceiling measuring operation, some of which are disclosed by the following group of patents. U.S. Pat. No. 3,911,588 to Ohneda for an Optical Marker; U.S. Pat. No. 5,012,585 to DiMaggio for a Laser Plumb-Bob Apparatus; U.S. Pat. No. 5,163,229 to Cantone for a Plumb And Horizontal Locating Device; U.S. Pat. No. 5,184,406 to Swierske for a Projected Light Plumb Device; U.S. Pat. No. 5,537,205 to Costa et al. for a Self Leveling Laser Plumb Assembly; and U.S. Pat. No. 5,539,990 to Le for a Three-Dimensional Optical Levelling, Plumbing and Angle-Calibrating Instrument. The foregoing group of patents generally teach apparatus in which a light projecting device is mounted on a free-swinging pendulum and the vertical orientation of the device is established by gravity. Essentially, the light projector device can swing until it settles at a low point, which is equal to the device finding a vertical orientation.

Another group which includes U.S. Pat. No. 4,751,782 to Ammann for Laser Beam Levelling Instruments; U.S. Pat. No. 4,912,851 for a Level/Plumb Indicator With Tilt Compensation; U.S. Pat. No. 5,524,352 and U.S. Pat. No. 5,541,727 each for an Automatic Level And Plumb Tool, the last three all to Rando et al. are devices with similar intent and which contain electro-servo vertical-seeking apparatus. They generally contain a sensor which is vertical-sensitive and which is connected to a servomotor drive for bringing the light projecting component to vertical.

Both groups of patents teach devices which project a light beam from a known location to a remote point. With regard generally to those gravity orienting group of devices having a pendular movement, it is believed that in field experience, the pendular movement requires excessive settling time at each new location, thus being somewhat inefficient. Further, the electro-servo group are devices which generally involve expensive apparatus when compared to the practical needs of the installation mechanic. None of the prior art noted teaches a light projector mounted on a manually adjustable pipe that, once set to vertical, will retain its position.

It is therefore an object of this invention to provide a beam projector plumb apparatus which is quick and simple to use.

It is a further object of this invention to provide a beam projector plumb apparatus which is inexpensive to manufacture.

Other objects and advantages will be more fully apparent from the following disclosure and appended claims.

SUMMARY OF THE INVENTION

The invention provides a simple, rugged and accurate apparatus illustrated in two embodiments each of which is adapted for locating a target point on a ceiling by the projection of a light beam from a known floor guide point position. Each embodiment includes an angularly adjustable pipe in which a beam projector is mounted. The apparatus of the first embodiment has a platform supported on three legs which are placed on the floor. The pipe is mounted in the platform in a manner allowing relative pivoting angularly without lateral movement. The pipe mounting also allows the pipe to slide parallel to its axis relative to the platform to a limited degree. A point formed at the lower end of the pipe is placed in contact with the floor at the known floor guide point, and the pipe is manipulated to a vertical orientation with the aid of a bubble level attached to the pipe. As the pipe is brought to vertical, the platform is moved laterally. The beam projector mounted co-axially with the pipe is activated so as to direct its beam at and locate a point on the ceiling which is vertically aligned with the known floor point.

The second embodiment apparatus of the invention has a housing having a reference point which is placed on a known point on the floor. The pipe is mounted to enable pivoting about a first end within the housing with its second end extending outwardly therefrom. The pipe is positioned vertically with the aid of an attached bubble level, locked in position and the co-axially mounted beam projector is activated to indicate by the target of its projected beam the desired point on the ceiling.

DETAILED DESCRIPTION OF THE INVENTION AND PREFERRED EMBODIMENTS THEREOF

Figure 1:
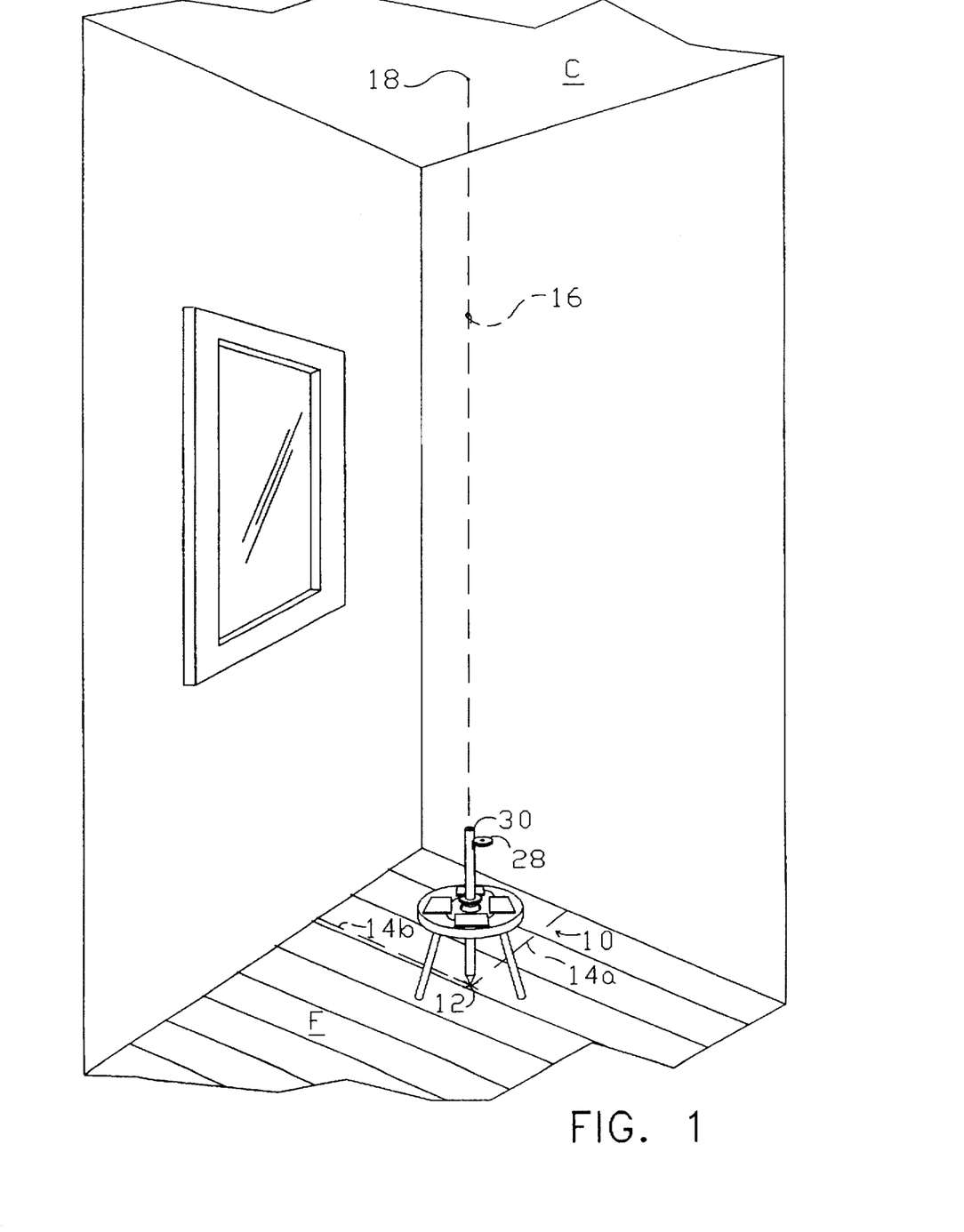
FIG. 1 is a perspective view of the interior of a building with the apparatus of the first embodiment of the invention placed on a floor surface so as to project a light beam vertically to the ceiling.

According to the brief descriptions above, the invention disclosed is directed to the operation of locating a point on a ceiling surface which is vertically over a known location on a floor surface. In the illustration of FIG. 1, a room is bounded by a floor surface F and a ceiling surface C. A guide point 12 on floor F is located by measuring a distance from each of two adjacent intersecting walls along respective measurement guide lines 14a and 14b, in accordance with an architectural plan. The beam projecting plumb apparatus 10 of the invention is positioned on guide point 12 and oriented to vertical, as will be described below. A light projector portion 30 of plumb apparatus 10 is activated to project a narrow, focused light beam 16 to target point 18 on ceiling C. Due to beam 16 being vertical and the fact that a projected beam follows a straight line, target point 18 is precisely over guide point 12. In addition, the location of target point 18 is accomplished without requiring a worker to measure the position of target point 18 from the walls at ceiling height.

Figure 2:
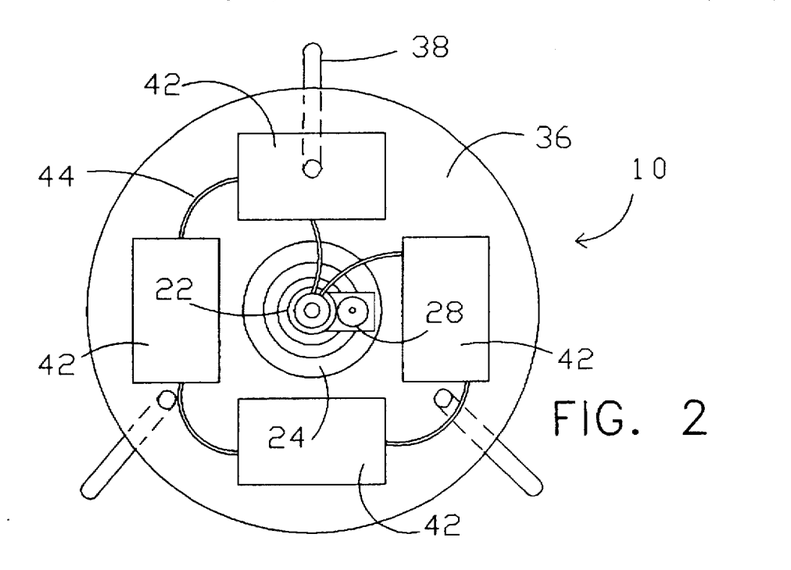
FIG. 2 is a top plan view of the apparatus of FIG. 1.
Figure 3:
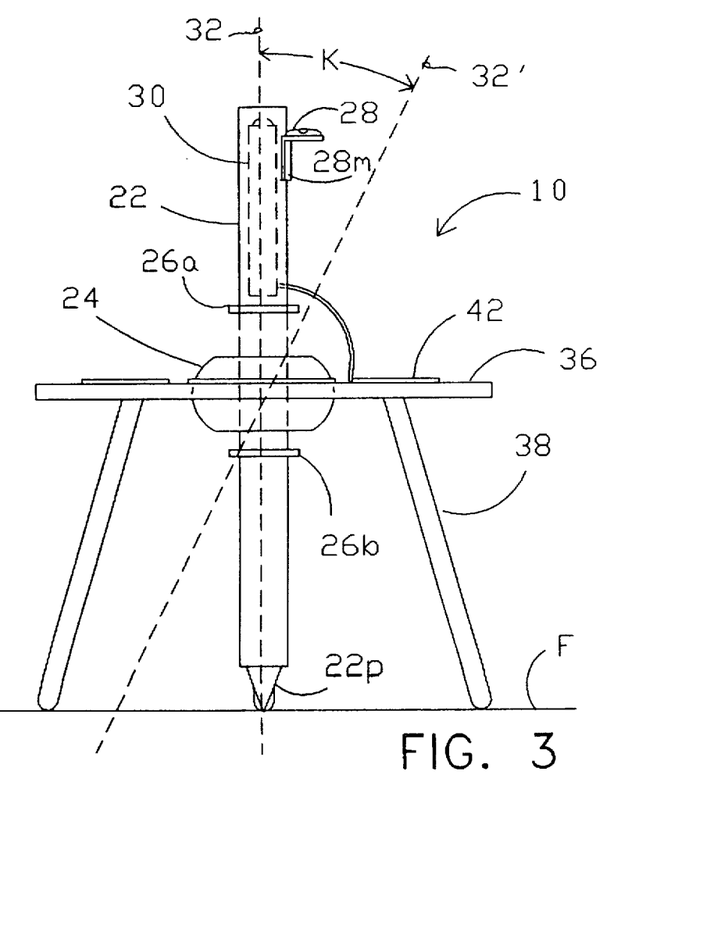
FIG. 3 is a side elevation view of the apparatus of FIG. 2.

The laser light plumb device 10 of the invention is depicted in elevation detail in FIG. 3 and in plan view in FIG. 2. The housing is configured as a pipe 22 with an internal cavity adapted to snugly accommodate a beam projector 30. The internal bore of pipe 22 is axially centered and aligned with tip 22p, which is formed on the lower end of pipe 22. The external diameter of pipe 22 is of a size to slidingly fit within spherical bearing 24 so as to have axial freedom therewithin, but be substantially radially immobile. An upper collar 26a and a lower collar 26b act as positional stops for pipe 22 so that if the device 10 is lifted by pipe 22, the base will be supported and carried along. Similarly, if the lower end of pipe 22 is positioned accidentally over a hole, pipe 22 will not drop through. Spherical bearing 24 is mounted within a hole in base 36 and is pivotable so as to allow pipe 22 angular freedom of movement K. Any device which will enable angular adjustment and restrict lateral movement, e.g., a gimbal-type mounting, serves equally well. Base 36 is supported on a set of three legs 38, each of which terminates at its lower end in a rounded foot portion. A levelling device 28, such as a bi-axial bubble level, is mounted on bracket 28m along pipe 22 at a position adjacent the upper end of pipe 22 so as to indicate a vertical orientation of pipe 22.

Projector 30, for example a laser beam projector, is powered by an array of photovoltaic cells 42. Projector 30 is assembled in a cavity in pipe 22 so as to project a beam of light in line with axis 32 of pipe 22. A particular laser projector suited to the objectives of the invention is available from Alpec Team, Inc. of Livermore, Calif. Cells 42 are mounted on the upper surface of base 36 for maximum exposure to light and are electrically connected to one another and to laser projector 30 in a series circuit by wires 44. It is recognized that a battery or other electrical source would be an acceptable alternative to cells 42. If a battery is used, a timer to automatically shut the power off, or a simple on/off switch, would be added. It is also recognized that any source of coherent light, such as that produced by a laser projector, would be satisfactory for use with the invention.

In the preferred embodiment, the base structure for pipe 22, comprising base 36 and legs 38, is of sufficient weight, for example, 2 kg.–3 kg (4.4 lbs.–6.6 lbs.), to substantially avoid accidental movement. A major portion of this weight is preferably contained in the lower portion of legs 38. This preferred weight distribution is to keep the center of gravity as low as possible for reasons of stability.

Figure 4A:
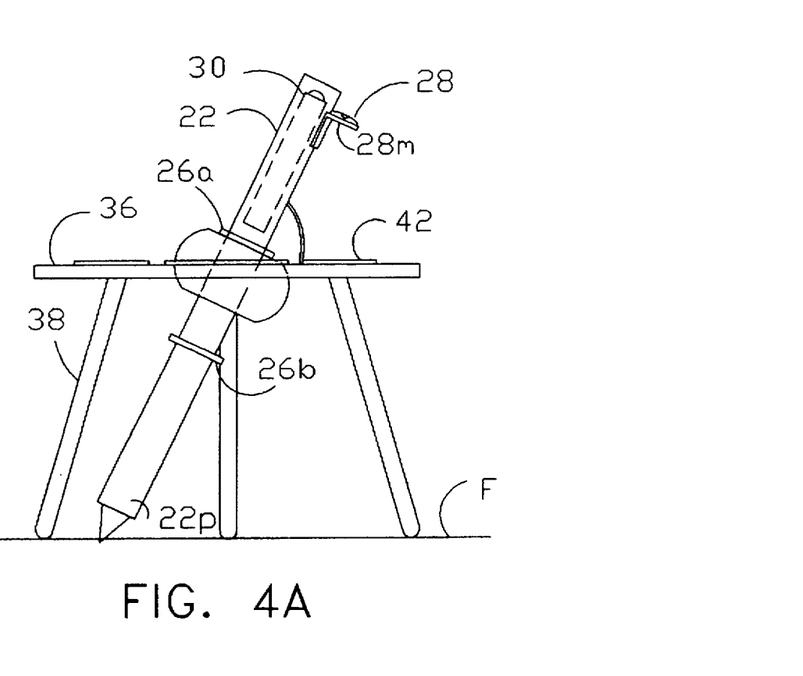
FIGS. 4A and 4B are schematic representations of the apparatus of FIG. 2 showing the mode of adjustment to orient the beam projector vertically.
Figure 4B:
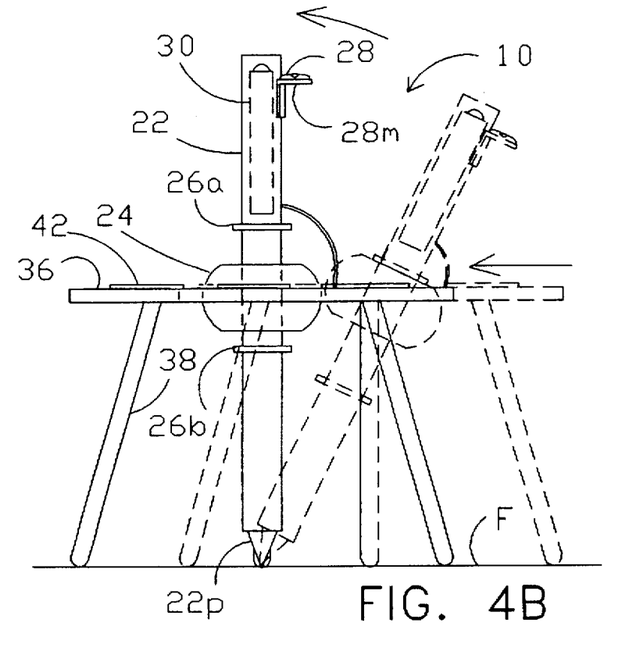

In use, laser plumb device 10 is placed on a surface, such as floor F, which is substantially horizontal, as illustrated in FIGS. 4A, 4B. When placed on a supporting surface, such as floor F F, pipe 22 will typically be in an orientation at an angle to vertical, as shown in FIG. 4A. The placement of collars 26a, 26b on the outer surface of pipe 22 is such as to allow substantial axial movement of pipe 22 within spherical bearing 24 so that point 22p contacts floor F. An operator simply manipulates pipe 22 into a vertical orientation, as indicated by level 28, while maintaining point 22p in contact with floor surface F at the desired guide point 12 (see FIG. 1). In so doing, base 36 and legs 38 are moved from the position shown in dashed lines to the position shown in solid lines in FIG. 4b, as pipe 22 is pivoted angularly. This adjustment results in pipe 22 being vertical and point 22p remaining in contact with the selected guide point 12 (see FIG. 1) on floor F. Projector 30 then projects a light beam to indicate target point 18 on ceiling C. In certain applications where a permanent mark on the ceiling is preferred to a light spot, projector 30 may be replaced with a device capable of firing a paint ball.

Whereas the device embodied in the present invention may be adaptable to use in any number of sizes, a particular advantage may be achieved by the elongate pipe 22 being of a length so that manipulation of the upper end thereof may be accomplished while the operator is standing. A length of between 750 mm–1000 mm (30 inches–40 inches) would be typical in this configuration. In any length, it is desired that pipe 22 be pivotally connected to base plate 36 at the approximate mid-point of pipe 22.

Figures 5, 6:
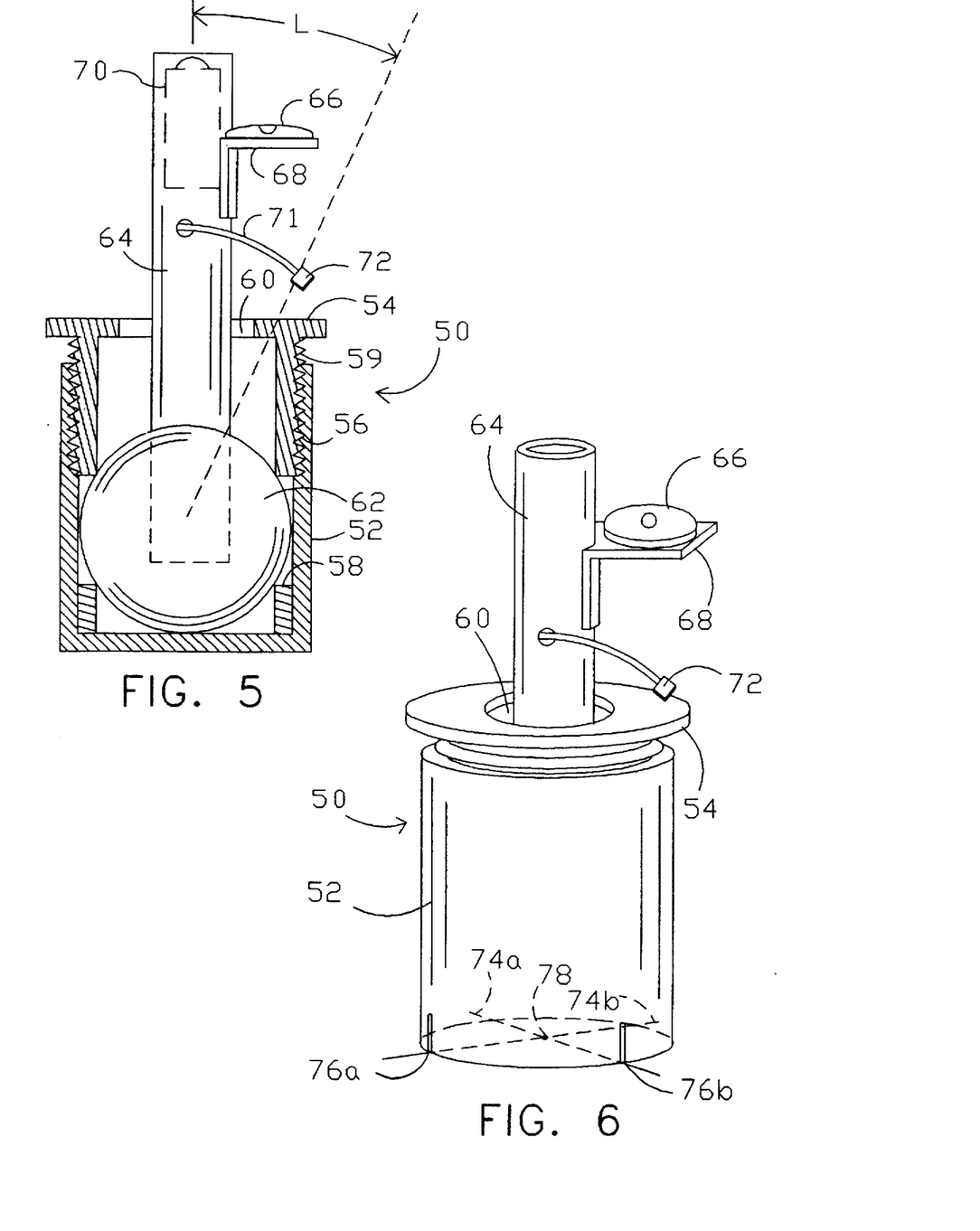
FIG. 5 is a side elevation view of the apparatus of the second embodiment, with a housing thereof shown in cross section for clarity.
FIG. 6 is a perspective view of the apparatus of FIG. 5 illustrating a reference point on the housing placed on a guide point on the floor for operation.

A second preferred embodiment of the present invention is shown in partial cross section in FIG. 5 and in perspective view in FIG. 6, and is adapted to utilize certain of the features of the first preferred embodiment. As shown, a base structure of plumb apparatus 50 is made up of cup 52 and clamp 54. Cup 52 is fitted with support ring 58 adjacent its lower internal surface and threads 56 on the internal upper cylindrical surface. Clamp 54 is formed as an inverted cup with external threads 59 configured to engage internal threads 56 in cup 52 and also having an opening 60 formed centrally through its top surface. Ball 62 is sized to fit slidingly within cup 52 and contact the upper inner edge of support ring 58. Ball 52 is formed with a radially aligned bore size to snugly receive pipe 64 therewithin. Pipe 64 is long enough to pass through opening 60 in clamp 54 and the relative diameters of pipe 64 and opening 60 are sized to permit angular movement L therebetween. A projector 70 is mounted coaxially within pipe 64 toward its upper end, and may be activated through switch 72 which is connected by means of a flexible cable 71 to avoid disturbing any settings made. A bi-axial bubble level 66, mounted on bracket 68 is arranged to enable alignment of pipe 64 to a vertical orientation. A series of four marks 76a, 76b (only two of which are shown) are positioned on the perimeter of cup 52 to be along mutually perpendicular radii. By positioning two adjacent marks 76a, 76b, for example, on a pair of perpendicularly intersecting lines 74a, 74b which cross at a guide point 78 marked on a supporting surface, the center 75 of the bottom surface of plumb apparatus 50 will be centered on the guide point 78 (see FIG. 6). It is to be understood that a non-level supporting surface will result in a degree of offset of pipe 64 relative to the desired guide point. This inaccuracy is deemed to be negligible.

Figures 7A, 7B:
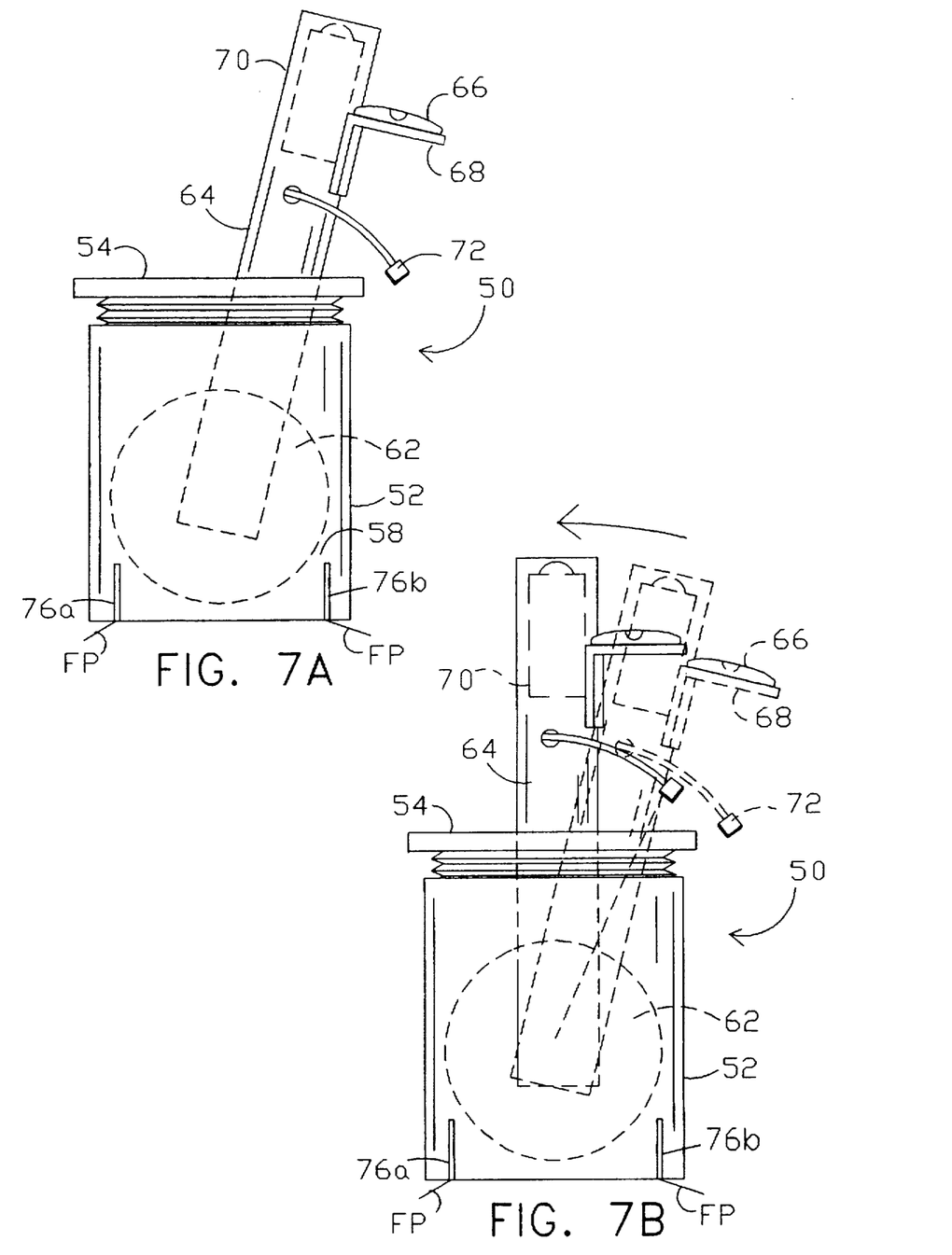
FIGS. 7A and 7B are schematic representations of the apparatus of FIG. 5 showing the mode of adjustment to orient the beam projector vertically.

Use of the device disclosed in this second preferred embodiment is illustrated schematically in FIGS. 7A and 7B. Firstly, plumb apparatus 50 is placed with marks 76a, 76b in alignment with a pair of perpendicularly intersecting lines (shown for illustrative purposes as FP) such that the center 75 of the bottom surface of cup 52 is aligned with the selected guide point 78 on the supporting surface. Initially clamp 54 is not fully engaged with cup 52 so that ball 62 is free to rotate. Next, an operator manipulates pipe 64 until level 66 indicates that pipe 64 is in a vertical orientation. The operator then screws clamp 54 to lock the position of ball 62, and thus lock the position of pipe 64 and prevent further relative movement prior to activating projector 70. Beam projector 70 may be powered by photovoltaic cells or by batteries. It is to be noted that in this embodiment, the base of the plumb apparatus, cup 52, does not move from the position indicated by lines FP in contrast to the adjustment of the first embodiment.

In the case of either of the first or the second preferred embodiment, a center point on the plumb apparatus is positioned on a supporting surface guide point, a pipe containing a laser or other coherent light beam projector is manipulated to achieve a vertical orientation while the point remains in contact with the guide point, and the beam projector is activated to indicate a position on a remote surface, such as a ceiling, which corresponds to the guide point on the supporting surface.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A beam projecting plumb apparatus for locating a target point on a remote surface which is in vertical alignment with a guide point on an opposed support surface, said apparatus comprising:

(a) a base structure;

(b) bearing means fixedly mounted on said base structure, a portion of said bearing means being spherically rotatable and having an aperture formed therethrough;

(c) an elongate member of substantially uniform diameter sized to slidingly fit within said aperture and extending from a lower end to an upper end thereof and said elongate member having a longitudinal axis;

(d) said elongate member being assembled into said aperture in said bearing means so that said elongate member is axially moveable, angularly pivotable and radially immobile with respect to said base structure;

(e) lower and upper stop means mounted on said elongate member to limit corresponding axial movement thereof;

(f) a beam projector assembled to said upper end of said elongate member in a manner enabling a beam produced thereby to be projected along a line forming an extension of said longitudinal axis outwardly from said base structure;

(g) a defined point on said lower end of said elongate member adapted to be centered on a guide point so that when said elongate member is vertically oriented said guide point is vertically aligned with a target point on an opposed surface; and (f) wherein the manner in which said elongate member is mounted on said base structure permits said defined point to contact a support surface while said base structure is moved thereon.

2. The beam projecting plumb apparatus as described in claim 1 wherein said base structure comprises a base plate supported at a selected distance above said support surface and pivotally mounting said elongate member thereon.

3. The beam projecting plumb apparatus as described in claim 1 wherein said beam projector comprises a laser projector.

4. The beam projecting plumb apparatus as described in claim 1, further comprising means to ascertain a vertical orientation of said elongate member.

5. The beam projecting plumb apparatus as described in claim 1, wherein said defined point on said plumb apparatus is formed on a lower end of said elongate member.

6. A plumb apparatus for locating a target point on a remote surface which is in vertical alignment with a guide point on an opposed support surface, said apparatus comprising:

(a) a base structure;

(b) bearing means fixedly mounted on said base structure, a portion of said bearing means being spherically rotatable and having an aperture formed therethrough;

(c) a hollow elongate member having a longitudinal axis;

(d) said elongate member being assembled slidingly into said aperture in said bearing means so as to be angularly pivotable, axially moveable, and radially immobile with respect to said base structure;

(e) a light beam projector mounted within said elongate member in a manner enabling a light beam produced thereby to be projected along said longitudinal axis outwardly from said base structure;

(f) means mounted on said elongate member enabling the vertical orientation thereof to be determined; and (g) a defined point on a lower portion of said plumb apparatus adapted to be maintained in contact with a guide point-on a support structure so that when said elongate member is vertically oriented said guide point is vertically aligned with a target point on an opposed surface.

* * * * *

UNITED STATES PATENT AND TRADEMARK OFFICE
CERTIFICATE OF CORRECTION

PATENT NO. : 5,754,287
DATED : May 19, 1998
INVENTOR(S) : Douglas A. Clarke

Page 1 of 2

It is certified that error appears in the above-identified patent and that said Letters Patent is hereby corrected as shown below:

Column 4, line 4, change "floor F F" to read --floor F--.

Column 4, line 58, delete "75".

Column 5, line 2, delete "75".

Replace sheet 4 of 5 including Figures 5 and 6 as printed with substitute sheet 4 of 5 enclosed on which the dashed line indicating movement "L" in Figure 5 has been moved to a different position.

Signed and Sealed this

Fifth Day of January, 1999

Attest:

Attesting Officer

Acting Commissioner of Patents and Trademarks

FIG. 5

FIG. 6